A. M. WOLF.
DIFFERENTIAL GEAR LOCK.
APPLICATION FILED SEPT. 8, 1909.
968,224.
Patented Aug. 23, 1910.
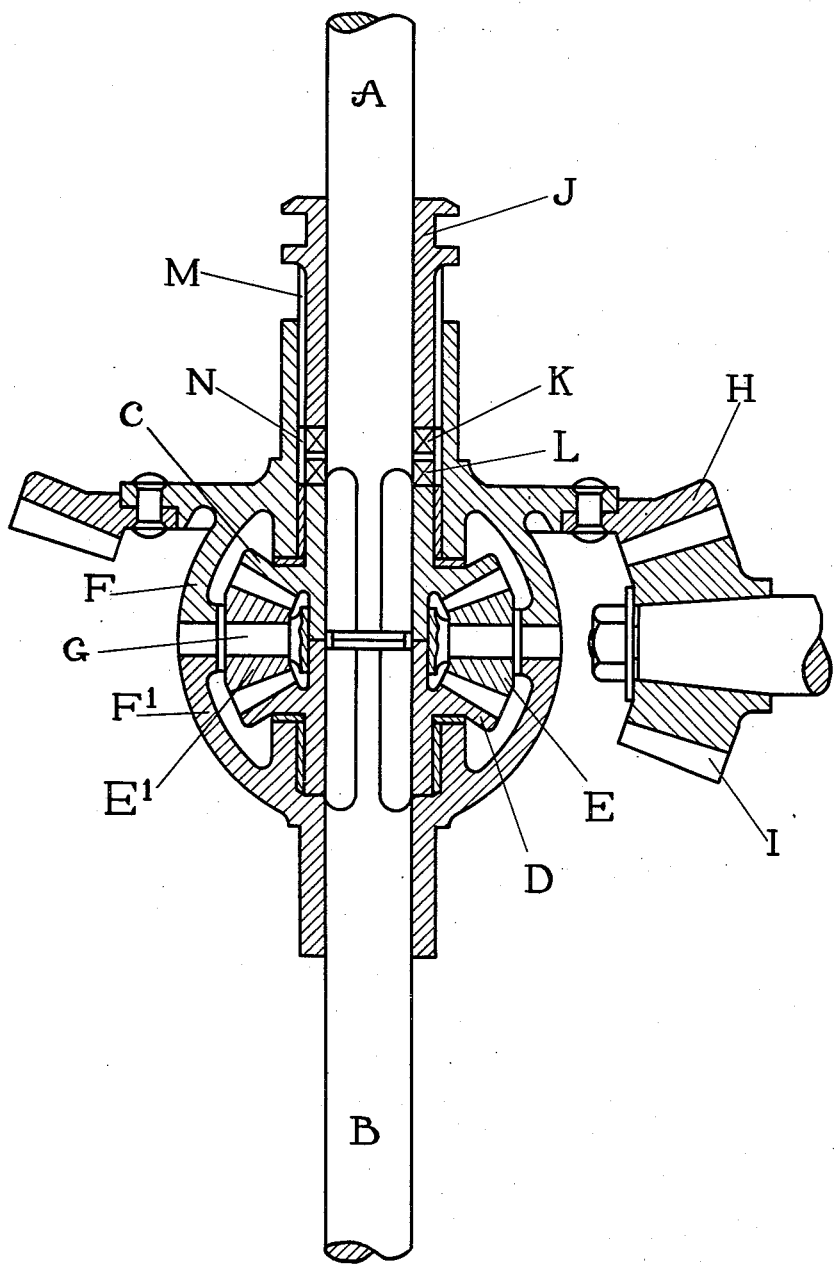
WITNESSES:
Louis Marcus
Vincent Koppel
INVENTOR.
Austin M. Wolf.

UNITED STATES PATENT OFFICE.

AUSTIN M. WOLF, OF NEW YORK, N. Y.

DIFFERENTIAL-GEAR LOCK.

968,224.  Specification of Letters Patent.  Patented Aug. 23, 1910.

Application filed September 8, 1909. Serial No. 516,799.

*To all whom it may concern:*

Be it known that I, AUSTIN M. WOLF, a citizen of the United States, residing at New York, in the borough of Manhattan, county of New York, and State of New York, have invented a new and useful Differential-Gear Lock, of which the following is a specification.

My invention relates to differential gearing, and its object is to provide a simple and efficient means whereby the divided shaft, whose sections are under the control of the differential gearing mechanism, may be locked together at the will of the operator. As applied to the motor-vehicle, the differential gearing is often a cause of loss of traction and other undesirable results. By providing a means whereby the two sections of the divided shaft may be made virtually one, many objections to the differential gearing, as now used, will be overcome. The means for providing the above will be more readily understood, reference being had to the accompanying drawing which is a sectional view of my improved differential gearing.

In the differential gearing shown, A and B represent the divided shaft. The squared ends of the same fit into the hubs of the gears C and D respectively. The pinions E, E' are housed within the shell F, F'. They are free to revolve on the arms of the spider G and mesh with gears C and D. The gear H is secured to the shell F, F' and meshes with the driving pinion I. In order to permit of assembling, the shell is built up of two sections; namely F and F'. Within F is mounted the gear C, whereas F' contains gear D. The spider G is held in position when the two sections of the shell are assembled.

A clutch member J, mounted upon shaft A and shiftable longitudinally upon the same, has as its object to lock the gear C to the shell F, F', preventing thereby relative motion between them. If the above is done, the pinions E, E' are no longer free to revolve. Since they cannot revolve, the gear D is prevented from rotating. Thus by locking one of the train of gears to the shell, the remaining ones cannot revolve and the whole mechanism revolves as one solid unit when the pinion I drives the gear H, irrespective of the circumstances of the shafts A and B.

The clutch member J has the clutching portions K located at its one end and corresponding clutching portions L are formed on the end of the hub of gear C. The member J loosely receives shaft A and is mounted within the shell member F so that it will turn positively with it and be shiftable longitudinally within the same. This is accomplished by having the feathers M located on member J fit into the corresponding grooves N within the shell member F. Suitable means (not shown) for shifting the clutch member J are provided.

It will be seen that upon shifting clutch member J there will be no relative motion between the gear C and the shell F, F' and therefore the shafts A and B rotate as if undivided when pinion I drives gear H. When the lock is not in use, the regular differential action is in no way prevented. It will be seen that the same improvement may be made upon a differential gearing of the spur gear type as well as the one of the bevel gear type shown. Since the only difference between the two types lies in the fact that spur gears replace the bevel gears C and D and a pair of spur pinions, meshing with each other and each one meshing separately with one of the spur gears mentioned, replace each of the bevel pinions E, E', the locking mechanism remains unchanged.

Having thus described my invention, what I claim and desire to protect by Letters Patent is:

In a mechanism of the character described, a divided shaft composed of two sections, a gear mounted on one of said sections, a gear having clutching portions mounted on the other of said sections, pinions meshing with said gears for allowing relative motion between said sections, said gears and pinions being mounted within a shell, and a clutch member shiftable longitudinally upon one of said sections having clutching portions capable of meshing with the clutching portions of one of said gears and mounted within a sleeved portion of said shell, substantially as described.

Whereunto I affix my name in the presence of two subscribing witnesses.

AUSTIN M. WOLF.

Witnesses:
  HENRY WOLF,
  HAMILTON A. WOLF.